United States Patent Office 3,476,720
Patented Nov. 4, 1969

3,476,720
VULCANIZABLE COPOLYMERS OF AT LEAST ONE OF MONOALKENYL CYCLOPENTENES, MONOALKENYL CYCLOALKENYLOCTENES AND THEIR ALKYL DERIVATIVES
Giulio Natta, Giorgio Mazzanti, and Alberto Valvassori, Milan, Italy, and Guido Sartori, Roselle, N.J., assignors to Montecatini Edison S.p.A., Milan, Italy, a corporation of Italy
No Drawing. Continuation-in-part of application Ser. No. 261,523, Feb. 27, 1963. This application Apr. 24, 1967, Ser. No. 632,887
Int. Cl. C08f 19/00
U.S. Cl. 260—79.5
22 Claims

ABSTRACT OF THE DISCLOSURE

Sulfur-vulcanizable, substantially linear, substantially amorphous, high molecular weight copolymers of:
(a) Ethylene,
(b) At least one higher alpha-olefin having the formula $CH_2=CHR$ in which R is an alkyl group containing 1 to 6 carbon atoms; and
(c) At least one monomer selected from the group consisting of mono-alkenyl cyclopentenes, and alkyl-mono-alkenyl cyclopentenes, mono-alkenyl cyclooctenes and alkyl-mono-alkenyl cyclooctenes consisting of macromolecules made up of copolymerized units of each of the starting monomers which are produced by copolymerizing mixtures of the monomers in contact with catalysts prepared from vanadium compounds and organometallic compounds of aluminum or beryllium.

---

This application is a continuation-in-part of our application Ser. No. 261,523 filed Feb. 27, 1963, now abandoned.

The prior art

The preparation of amorphous copolymers of ethylene and higher alpha-olefins with conjugated or non-conjugated linear or cyclic dienes has been described.

The preparation of sulfur-vulcanizable copolymers of ethylene and alpha-olefins with vinylcyclohexene has also been described.

The last-mentioned copolymers, however, have not been found to yield elastomers having the mechanical properties required for many commercial purposes, on vulcanization thereof with the aid of conventional sulfur-containing recipes.

Thus, when a terpolymer of ethylene, propylene and 4-vinyl-cyclohexene-1 is vulcanized at 150° C. during 60 minutes using a vulcanization mix which contains 100 parts by weight of copolymer, 50 parts by weight of HAF black, 5 parts by weight of zinc oxide, 1.5 parts by weight of surfur, 1.5 parts by weight of tetramethylthiuram monosulfide and 0.5 parts by weight of mercaptobenzothiazole, a vulcanizate having the following characteristics is obtained:

| | |
|---|---|
| Tensile strength | kg./cm.² 180 |
| Elongation at break | percent 700 |
| Modulus at 300% | kg./cm.² 60 |
| Permanent set | percent 30 |

The high value of the parmanent set and the low value of the modulus demonstrate that the mechanical characteristics of the vulcanizate are very poor.

The present invention

We have found that the number of carbon atoms in the cycloalkene ring has a positive influence on terpolymers with ethylene and the higher alpha-olefin, and on the ability of the terpolymers to be sulfur-vulcanized to synthetic rubbers having good mechanical properties (including permanent set and modulus), and commercially acceptable for the various purposes for which synthetic rubbers are used.

More especially, we have found that terpolymers of ethylene, at least one higher alpha-olefin as defined, and at least one termonomer selected from monoalkenyl cyclopentenes, alkyl-monoalkenyl cyclopentenes, monoalkenyl cyclooctenes and alkyl-monoalkenyl cyclooctenes, when prepared according to this invention, are of a character such as, on vulcanization in contact with sulfur-containing mixes, to yield vulcanizates (synthetic rubbers) having excellent mechanical properties, including desirably low values for the permanent set and high values for the modulus.

Accordingly, an object of this invention is to provide sulfur-vulcanizable, substantially linear, substantially amorphous, high molecular weight copolymers of ethylene, at least one higher aliphatic alpha-olefin and at least one monomer which is a particular and specific mono-alkenyl cycloalkene or alkyl-monoalkenyl cycloalkene and which copolymers, when vulcanized with the aid of conventional sulfur-containing recipes, yield vulcanizates having excellent elastomeric properties.

This and other objects are accomplished by copolymerizing a mixture of: (a) ethylene, (b) at least one higher alpha-olefin having the formula $CH_2=CHR$ in which R is an alkyl group containing 1 to 6 carbon atoms; and (c) at least one monomer selected from the group consisting of alkyl-monoalkenyl cyclopentenes, mono-alkenyl cyclopentenes, mono-alkenyl cyclooctenes and alkyl-monoalkenyl cyclooctenes, in liquid phase and in contact with a catalyst prepared by mixing a vanadium compound and an organometallic compound of aluminum or beryllium, at least one of these catalyst-forming components being halogenated.

The particular mono-alkenyl cycloalkenes and alkyl-monoalkenyl cycloalkenes used in practicing the invention include, as such or in mixture thereof:

3-vinylcyclopentene-1,
1-allyl-cyclopentene-1,
3-buten-3-yl-cyclopentene-1,
1-penten-4-yl-cyclopentene-1,
3-methyl-1-buten-3-yl-cyclopentene-1,
2,3,3-trimethyl-4-vinylcyclopentene-1,
3-penten-4-yl-cyclopentene-1,
1,2-divinyl-cyclooctene-5,
2-methyl-allyl-cyclopentene-1,
3-vinyl-cyclooctene-1

For instance, by copolymerizing a mixture of ethylene, propylene and/or butene-1 and 1-allyl-cyclopentene-1, by the process of this invention, there is obtained a crude copolymerization product which consists of linear macromolecules each consisting of randomly distributed polymerized units of ethylene, propylene (and/or butene-1) and 1-allyl-cyclopentene-1. This copolymerization product, when vulcanized under conventional conditions, with the aid of conventional sulfur-containing mixes yields a vulcanizate having excellent mechanical characteristics.

Each polymerized unit of the above mentioned specific class of monoalkenyl cycloalkenes and alkyl-monoalkenyl cycloalkenes still contains one free double bond. The IR spectrum of the copolymers which are the object of the present invention shows in fact the presence of unsaturations. The copolymers of the present invention have a molecular weight, determined viscosimetrically, higher than 20,000 and corresponding to an intrinsic viscosity in excess of 0.5 as determined in tetrahydronaphthalene at 135° C., or in toluene at 30° C. [G. Moraglio "La Chimica e l'Industria," 41, 10 (1959) 984–987]. The intrinsic viscosity of these copolymers can vary from 0.5 up to 10 or higher. For most practical purposes, however, the copolymers having an intrinsic viscosity of between 1 and 5 are preferred.

The copolymers are homogeneous, both in being substantially free of homopolymers of the respective starting monomers and also in having sites of unsaturation distributed substantially uniformly along the macromolecular main chain.

A confirmation of this homogeneity is given by the fact that well vulcanized products are obtained by using the mixes and techniques normally used in the vulcanization of unsaturated rubbers, and more specifically when using the mixes and techniques normally used in the vulcanization of unsaturated rubbers having a low unsaturation content such as butyl rubber. This also shows that the unsaturations are well distributed along the main chain of the macromolecules.

The vulcanized products thus obtained, as distinguished from the non-vulcanized polymers, which are completely extractable with boiling n-heptane, are completely insoluble in organic solvents and are swollen only to a limited extent by some organic aromatic solvents.

The vulcanized rubbers thus obtained have very good mechanical strength and have a low permanent set at break.

The mechanical strength can further be increased by addition of suitable reinforcing fillers.

The new polymerizates are obtained by carrying out the polymerization in a dispersion, or in a solution, of the catalyst in an inert liquid polymerization medium.

The catalysts used are obtained by mixing vanadium compounds, and more preferably vanadium compounds soluble in the hydrocarbons employed as the polymerization medium, with organometallic compounds of aluminum or beryllium.

Organometallic compounds which can be used as catalyst-forming component, include the following: aluminum trialkyls, aluminum dialkyl monohalides, aluminum monoalkyldihalides, lithium aluminum tetraalkyls, alkenyl aluminum compounds, alkylene aluminum compounds, cycloalkyl aluminum compounds, aluminum cycloalkylalkyl compounds, aryl aluminum compounds, alkylaryl aluminum compounds, beryllium dialkyls, beryllium alkyl halides or complexes of the aforementioned organic aluminum compounds with preferably weak Lewis bases.

The following organometallic compounds which may be employed in the preparation of the catalyst are cited as illustrative, not restrictive, examples: aluminum triethyl, aluminum triisobutyl, aluminum trihexyl, aluminum diethylmonochloride, aluminum diethyl monoiodide, aluminum diethyl monofluoride, aluminum diisobutyl monochloride, aluminum monoethyldichloride, aluminum ethyl-sesquichloride, lithium aluminum tetrahexyl, aluminum butenylethyl, aluminum isohexenyldiethyl, 2-methyl-1, 4-di-(diisobutylaluminum) butane, aluminum tri-(cyclopentylmethyl), aluminum tri-(dimethyl cyclopentylmethyl), aluminum triphenyl, aluminum tritolyl, aluminum di-(cyclopentyl methyl) monochloride, aluminum diphenylmonochloride, aluminum diisobutylmonochloride complexed with anisole, beryllium diethyl, beryllium methylchloride.

The vanadium compound used as the second catalyst-forming component is, preferably, one which is soluble in the hydrocarbon used as the inert polymerization medium.

Examples of such hydrocarbon-soluble vanadium compounds are vanadium halides and oxyhalides (such as e.g., $VCl_4$, $VOCl_3$, $VBr_4$); and such compounds wherein at least one of valences of the metal is saturated by a heteroatom (in particular oxygen or nitrogen) bound to an organic group, such as for instance; vanadium triacetylacetonate, vanadium tribenzoylacetonate, vanadyl diacetylacetonates and the haloacetylacetonates, vanadyl trialcoholates and haloalcoholates, the tetrahydrofuranates, etherates, the aminates of vanadium tri- and tetrachloride and of vanadyl trichloride, and the pyridinates and quinolinates of vanadium tri- and tetrachloride and of vanadyl trichloride.

Vanadium compounds which are insoluble in hydrocarbons may also be used in preparing the catalysts, particularly, the organic salts such as e.g., vanadium triacetate, tribenzoate, and tristearate.

At least one of the catalyst components should contain halogen atoms.

The polymerization process according to the present invention can be carried out at temperatures in the range between −80° C. and 125° C.

When catalysts prepared from a vanadium compound in the presence of aluminum alkylhalides are utilized, it is convenient to carry out both the preparation of the catalyst and the copolymerization at temperatures in the range between 0° C. and −80° C., and preferably between −10° C. and −50° C., in order to obtain high yields of copolymers per unit weight of catalyst employed.

The activity of such catalyst systems prepared at the low temperatures is higher than that of the same catalyst systems prepared at temperatures in the upper part of the range −80° C. to 125° C., and the activity remains practically unaltered over a long period of time.

When catalysts prepared from aluminum alkylhalides and vanadium triacetylacetonate, vanadyl trialcoholates or vanadyl haloalcoholates are used, at temperatures in the range between 0° C. and 125° C., it is convenient to operate in the presence of particular complexing agents selected from ethers, thioethers, tertiary amines and trisubstituted phosphines containing at least one branched alkyl group or an aromatic nucleus, since the use of the complexing agent increases the yield of terpolymer obtained. The complexing agent can be an ether of the formula RYR′ in which Y is oxygen or sulphur and R and R′ each represent a linear or branched alkyl group containing from 1 to 14 carbon atoms or an aromatic nucleus containing from 6 to 14 carbon atoms, one of R and R′ being a branched alkyl group or an aromatic nucleus; a tertiary amine of the formula

in which R to R″ each represent an alkyl group containing from 1 to 14 carbon atoms or an aromatic nucleus containing from 6 to 14 carbon atoms, one of R to R′ being an aromatic nucleus; or a tertiary phosphine

in which R to R″ each represent an alkyl radical containing from 1 to 14 carbon atoms or an aromatic nucleus containing from 6 to 14 carbon atoms, at least one of R to R″ being an aromatic nucleus.

The amount of complexing agent is preferably comprised between 0.05 and 1 mol per mol of aluminum alkylhalide.

In general, the activity of the catalyst varies with the molar ratio of the compounds used in the preparation of the catalyst.

According to the present invention it has been found that if, e.g., aluminum trialkyl and vanadium halides or oxyhalides are used, it is convenient to use catalyst in which the molar ratio of aluminum trialkyl to vanadium compound is comprised between 1 and 5, and preferably between 2 and 4.

However, if aluminum diethyl monochloride $$Al(C_2H_5)_2Cl$$

and vanadium triaetylacetonate (VAc₃) are used, the best results are obtained with an Al(C₂H₅)₂Cl/VAc₃ molar ratio comprised between 2 and 20, and preferably between 4 and 10.

The polymerization of this invention can be carried out in an inert aliphatic, cycloaliphatic or aromatic hydrocarbon solvent, such as butane, pentane, n-heptane, cyclohexane, toluene, xylene or mixtures of such solvents.

Halogenated hydrocarbons which, under the polymerization conditions, do not react with the catalyst, such as e.g., chloroform, trichloroethylene, tetrachloroethylene, chlorobenzenes, methylene chloride, dichloroethane can also be used as solvents.

Particularly high yields of copolymer can be obtained by dispensing with the extraneous inert solvent and using the monomers in the liquid state as the polymerization medium, i.e., by using a solution of ethylene in the mixture of alpha-olefin and of moonalkenyl cycloalkene or alkyl-monoalkenyl cycloalkene.

The most homogeneous copolymers are obtained by maintaining the monomer concentrations in the liquid phase constant, or as nearly constant as is possible during the polymerization. This can be facilitated by carrying out the polymerization on a continuous basis, by continuously feeding and discharging a mixture of the monomers having a constant composition, and operating at high space velocities.

It is however possible to operate without any discharging of the gaseous phase and introduce after solvent saturation a gaseous mixture in which the monomers are present in the same relative ratio at which they enter into the copolymer.

The catalytic system used may be prepared in absence of the monomers or the catalyst components may be mixed in the presence of the monomers to be copolymerized. The catalyst components may also be fed continuously during the polymerization.

The composition of the copolymers can be varied within wide limits by varying the composition of the mixture of monomers.

If amorphous copolymers of a monoalkenyl cycloalkene or alkyl-monoalkenyl cycloalkene with ethylene and propylene are desired, a molar ratio of ethylene to propylene lower than or at most equal to 1:4 should be maintained in the reacting liquid phase, molar ratios of 1:100 to 1:4 being satisfactory. If on the contrary butene-1 is used in place of propylene, the ethylene/butene molar ratio should be lower than or at most equal to 1:20, molar ratios of 1:1000 to 1:20 being satisfactory. Under these conditions, amorphous copolymers are obtained which contain less than about 75% by moles of ethylene.

If these values are exceeded, the resulting polymer may present a crystallinity of polyethylenic type.

The lower limit of the ethylene content is not critical, however it is preferable for the copolymers to contain at least 5% by moles of ethylene. The alpha-olefin content in the amorphous copolymer may preferably vary from a minimum of 5% by moles up to a maximum content of 95% by moles. Preferred copolymers, which result in vulcanizates having the best properties contain from about 20% to about 70% by weight of ethylene.

It is generally convenient to introduce into the copolymer, an amount of monoalkenyl cycloalkene or alkyl-monoalkenyl cycloalkene lower than 20%, and preferably ranging from 0.1 to 20% by moles. This upper limit can be raised but, especially for economic reasons, it is not convenient to introduce into the polymer an amount of monoalkenyl cycloalkene or alkyl-monoalkenyl cycloalkene higher than 20% by moles.

Amorphous copolymers are generally preferred as intermediates for the preparation of elastomeric vulcanizates; in certain cases, however, copolymers having an ethylene content slightly in excess of 75% by mols and showing a certain polyethylenic crystallinity may also find useful applications.

The following examples are given to better illustrate this invention; however, the examples are not intended to be restrictive or in any way limit the scope of this invention.

EXAMPLE 1

The reaction apparatus consists of a glass cylinder having a diameter of 7 cm. and a volume of 1500 cm.³, provided with stirrer and inlet and outlet tubes for the gases. The gas inlet tube reaches the cylinder bottom and ends in a porous diaphragm (diameter 3.5 cm.).

700 cm.³ of anhydrous n-heptane and 3 cm.³ of 1-allyl-cyclopentene-1 are introduced into the reactor kept at −20° C. A gaseous propylene:ethylene mixture in the molar ratio 2:1 is introduced through the gas inlet tube and circulated at the rate of 450 N l./h. The catalyst is preformed in a 100 cm.³ flask at −20° C. under nitrogen pressure by reacting 1 millimole of vanadium tetrachloride and 5 millimoles of ethylaluminum sesquichloride ½[Al₂(C₂H₃)₃Cl₃] in 50 cm.³ of n-heptane. The thus prepared catalyst is siphoned into the reactor by means of nitrogen pressure. The ethylene-propylene mixture is continuously fed and discharged at the rate of 450 N l./h.

15 minutes after the introduction of the catalyst, the reaction is stopped by adding 10 cm.³ of methanol containing 0.1 g. of phenyl-beta-naphthylamine.

The product is purified by repeated treatments with diluted hydrochloric acid and then with water and is coagulated in acetone.

After vacuum drying, 23 g. of solid product are obtained, which is amorphous at the X-rays, looks like a non-vulcanized elastomer and is completely soluble in boiling n-heptane. IR spectrographic analysis shows the presence of tri-substituted double bonds (band at 12.5μ).

The ethylene-propylene molar ratio is about 1:1.

100 parts by weight of terpolymer are mixed in a laboratory roll mixer, with 50 parts of HAF black, 5 parts of zinc oxide, 1.5 parts of sulfur, 1.5 parts of tetramethylthiuram monosulfide and 0.5 part of mercaptobenzothiazole.

The terpolymer is vulcanized at 150° C. for different times. The characteristics of the vulcanizates are reported in the following table:

| Time (minutes) | 15 | 30 | 60 | 90 | 120 | 240 |
|---|---|---|---|---|---|---|
| Tensile strength (kg./cm.²) | 222 | 265 | 235 | 216 | 216 | 196 |
| Elongation at break (percent) | 900 | 620 | 430 | 380 | 350 | 300 |
| Modulus at 200% (kg./cm.²) | 23 | 39 | 68 | 83 | 87 | 106 |
| Modulus at 300% (kg./cm.²) | 36 | 80 | 144 | 158 | 180 | 196 |
| Permanent set (percent) | 48 | 20 | 10 | 8 | 6 | 4 |

EXAMPLE 2

700 cm.³ of anhydrous n-heptane and 4 cm.³ of 1-allyl-cyclopentene-1 are introduced into the same reaction apparatus described in Example 1, kept at −20° C.

A gaseous propylene/ethylene mixture in the molar ratio 2:1 is introduced and circulated through the gas inlet tube at a rate of 300 N l./h. The catalyst is preformed in a 100 cm.³ flask at −20° C. under nitrogen atmosphere, by reacting 1 millimole of vanadium oxytrichloride and 5 millimoles of aluminum diethyl monochloride in 25 cm.³ of anhydrous n-heptane.

The thus preformed catalyst is siphoned into the reactor by means of nitrogen atmosphere.

The gaseous ethylene/propylene mixture is continuously introduced and discharged at a rate of 300 N l./h.

15 minutes after the introduction of the catalyst, the reaction is stopped by adding 10 cm.³ of methanol containing 0.1 g. of phenyl-beta-naphthylamine. The product is purified and isolated as described in Example 1.

After vacuum drying, 23 g. of a solid product are obtained which is amorphous at the X-rays, looks like a non-vulcanized elastomer and is completely soluble in boiling n-heptane. IR spectrographic examination shows the presence of tri-substituted double bonds (band at $12.5\mu$).

The ethylene/propylene molar ratio is about 1:1.

The polymer is vulcanized with the same mix and the same modalities of Example 1.

The characteristics of the vulcanizates are reported in the following table.

| Time (minutes) | 15 | 30 | 60 | 90 | 120 | 240 |
|---|---|---|---|---|---|---|
| Tensile strength (kg./cm.²) | 190 | 220 | 210 | 186 | 181 | 196 |
| Elongation at break (percent) | 840 | 600 | 400 | 340 | 300 | 326 |
| Modulus at 200% (kg./cm.²) | 26 | 46 | 71 | 93 | 98 | 94 |
| Modulus at 300% (kg./cm.²) | 41 | 87 | 139 | 165 | 181 | 177 |
| Permanent set (percent) | 50 | 22 | 8 | 6 | 6 | 6 |

EXAMPLE 3

200 cm.³ of anhydrous n-heptane and 15 cm.³ of 3-vinyl-cyclooctene-1 are introduced into a reaction apparatus similar to the one described in Example 1, but having a volume of 700 cm³, kept at $-20°$ C.

Through the gas inlet tube a gaseous propylene/ethylene mixture in the molar ratio 2:1 is introduced and circulated at the rate of 300 N l./h. The catalyst is preformed at $-20°$ C. under nitrogen atmosphere by reacting 1.5 millimoles of vanadium tetrachloride and 7.5 millimoles of ethyl aluminum sesquichloride $$\tfrac{1}{2}[Al_2(C_2H_5)_3Cl_3]$$

The thus preformed catalyst is siphoned into the reactor by means of nitrogen pressure. The gaseous mixture is fed and discharged at a rate of 300 N l./h.

60 minutes after the introduction of the catalyst, the reaction is stopped by adding 10 cm.³ of methanol containing 0.1 g. of phenyl-beta-naphthylamine. The product is purified and isolated as described in Example 1.

After vacuum drying, 9.2 g. of a solid product are obtained which is amorphous at the X-rays, looks like a non-vulcanized elastomer and is completely soluble in boiling n-heptane.

IR spectrographic examination shows the presence of unsaturations (band at $13.3\mu$).

The ethylene/propylene molar ratio is about 1:1.

The terpolymer is vulcanized with the same mix of Example 1 at 150° C. during 60'.

A vulcanized lamina having the following characteristics is obtained:

| | |
|---|---|
| Tensile strength _____kg./cm.² | 198 |
| Elongation at break _____percent | 300 |
| Modulus at 200% _____kg./cm.² | 81 |
| Modulus at 300% _____kg./cm.² | 145 |
| Permanent set _____percent | 12 |

EXAMPLE 4

The reaction apparatus consists of a 100 cm.³ flask provided with stirrer and with inlet and outlet tubes for the gases. 20 cm.³ of anhydrous n-heptane and 7 cm.³ of 3-vinylcyclopentene are introduced into the apparatus which is kept at $-20°$ C.

Through the gas inlet tube, a gaseous ethylene/propylene mixture in the molar ratio of 1:2 is introduced and circulated at the rate of 75 N l./h.

The catalyst is preformed in a 100 cm.³ flask at $-20°$ C. under nitrogen atmosphere by reacting 0.5 millimole of vanadium tetrachloride and 2.5 millimoles of ethyl aluminum sesquichloride $\tfrac{1}{2}[Al_2(C_2H_5)_3Cl_3]$ in 20 cm.³ of anhydrous n-heptane.

The thus preformed catalyst is siphoned into the reactor by means of nitrogen pressure. The gaseous mixture is continuously fed and discharged at the rate of 75 N l./h.

30 minutes after the addition of the catalyst, the reaction is stopped by adding 5 cm.³ of methanol containing 0.1 g. of phenyl-beta-naphthylamine. The polymer is purified and isolated as described in Example 1.

After vacuum drying, 1.6 g. of solid product are obtained which is amorphous at the X-rays, looks like a non-vulcanized elastomer and is completely soluble in boiling n-heptane. IR spectrographic examination shows the presence of vinyl double bonds (bands at 10.2 and $11\mu$).

The ethylene/propylene molar ratio is about 1:1.

The terpolymer is vulcanized with the same mixture and the same modalities of Example 3. A vulcanized lamina having the following characteristics is obtained:

| | |
|---|---|
| Tensile strength _____kg./cm.² | 170 |
| Elongation at break _____percent | 460 |
| Modulus at 200% _____kg./cm.² | 60 |
| Modulus at 300% _____kg./cm.² | 125 |
| Permanent set _____percent | 12 |

Modifications can be made in carrying out the invention without departing from the spirit thereof and it is intended to include in the scope of the appended claims all such modifications which will be obvious to those skilled in the art from the disclosures made therein and the illustrative examples given.

What is claimed is:

1. Sulfur-vulcanizable, high molecular weight, substantially linear, substantially amorphous copolymers of
   (a) ethylene
   (b) at least one higher alpha-olefin having the formula $CH_2=CHR$ in which R is an alkyl group containing 1 to 8 carbon atoms; and
   (c) at least one monomer selected from the group consisting of mono-alkenyl cyclopentenes, alkyl-monoalkenyl cyclopentenes, mono-alkenyl cyclooctenes and alkyl-monoalkenyl cyclooctenes, in which the alkenyl groups are terminally unsaturated, said copolymers consisting essentially of unsaturated macromolecules each made up of copolymerized units of each of the starting monomers, and the proportion of copolymerized ethylene in the copolymers being not greater than about 70% by weight, the proportion of the monoalkenyl cycloalkene being from about 0.1 to 20% by mols, the balance being higher alpha-olefin.

2. Copolymers according to claim 1, characterized in consisting essentially of macromolecules made up of copolymerized units of ethylene, propylene and at least one monomer selected from the group consisting of mono-alkenyl cyclopentenes, alkyl-monoalkenyl cyclopentenes, mono-alkenyl cyclooctenes and alkyl-monoalkenyl cyclooctenes.

3. Copolymers according to claim 2, characterized in containing from about 20% to about 70% by weight of ethylene.

4. Copolymers according to claim 1, characterized in consisting essentially of macromolecules made up of copolymerized units of ethylene, butene-1 and at least one monomer selected from the group consisting of mono-alkenyl cyclopentenes, alkyl-monoalkenyl cyclopentenes, mono-alkenyl cyclooctenes and alkyl-monoalkenyl cyclooctenes.

5. Copolymers according to claim 4, characterized in containing from about 20% to about 70% by weight of ethylene.

6. Copolymers according to claim 1, characterized in consisting essentially of macromolecules made up of copolymerized units of ethylene, propylene and 1-allyl-cyclopentene-1.

7. Copolymers according to claim 1, characterized in consisting essentially of macromolecules made up of copolymerized units of ethylene, propylene and 3-vinyl-cyclopentene-1.

8. Copolymers according to claim 1, charactedized in consisting essentially of macromolecules made up of copolymerized units of ethylene, propylene and 3-vinyl-cyclooctene-1.

9. A process for producing the copolymers according to claim 1, characterized in that a mixture of the starting monomers is copolymerized in liquid phase and in contact with a catalyst prepared from a vanadium compound and (B) a substance selected from (A) the group consisting of organometallic compounds of aluminum and organometallic compounds of beryllium, at least one of the catalyst-forming components containing halogen, at a temperature in the range —80° C. to +125° C., and while maintaining an excess of the higher alpha-olefin, in respect to the ethylene, in the liquid reaction phase.

10. The process according to claim 9, characterized in that the catalyst-forming component (A) is a vanadium compound soluble in hydrocarbons.

11. The process according to claim 9, characterized in that the catalyst-forming component (A) is a vanadium halide.

12. The process according to claim 9, characterized in that the catalyst-forming component (A) is a vanadium oxyhalide.

13. The process according to claim 9, characterized in that the catalyst-forming component (A) is a vanadium compound having at least one of the valences saturated by a heteroatom selected from the group consisting of oxygen and nitrogen atoms, bound to an organic group.

14. The process according to claim 9, characterized in that the catlyst-forming component (B) is an aluminum compound.

15. The process according to claim 9, characterized in that the catalyst-forming component (B) is a beryllium compound.

16. The process according to claim 9, characterized in that the mixture of the starting monomers is copolymerized in contact with a catalyst prepared from (A) a vanadium compound and (B) an aluminum alkylhalide and that both the catalyst preparation and the copolymerization are carried out at a temperature in the range 0° C. to —80° C.

17. The process according to claim 9, characterized in that the catalyst is obtained by mixing an alkyl aluminum halide with a vanadium compound selected from the group consisting of vanadium triacetylacetonate, vanadyl trialcoholates and vanadyl haloalcoholates, and the mixture of the starting monomers is copolymerized in contact therewith at a temperatures between 0° and 125° C., and in the presence of at least one complexing agent selected from the group consisting of ethers, thioethers, tertiary amines and tri-substituted phosphines.

18. The process according to claim 9, characterized in that the copolymerization is carried out in an inert hydrocarbon solvent.

19. The process according to claim 9, characterized in that the copolymerization is carried out in a reaction medium consisting of a solution of ethylene in a liquid phase consisting of at least one higher alpha-olefin and at least one monomer selected from mono-alkenyl cyclopentenes, alkyl-monoalkenyl cyclopentenes, mono-alkenyl cyclooctenes and alkyl-monoalkenyl cyclooctenes.

20. The process according to claim 9, characterized in that the monomers copolymerized are ethylene, propylene and at least one monomer selected from mono-alkenyl cyclopentenes, alkyl-monoalkenyl cyclopentenes, mono-alkenyl cyclooctenes and alkyl-monoalkenyl cyclooctenes and the propylene to ethylene molar ratio in the liquid phase is at least 4:1.

21. The process according to claim 9, characterized in that the monomers polymerized are ethylene, butene-1 and at least one monomer selected from mono-alkenyl cyclopentenes, alkyl-monoalkenyl cyclopentenes, mono-alkenyl cyclooctenes and alkyl-monoalkenyl cyclooctenes and the butene-1 to ethylene molar ratio in the liquid phase is at least 20:1.

22. The copolymers of claim 1, sulfur-vulcanized to an elastomeric material.

References Cited
UNITED STATES PATENTS

| | | | |
|---|---|---|---|
| 3,383,371 | 5/1968 | Natta | 260—79.5 |
| 3,385,840 | 5/1969 | Natta | 260—88.2 |
| 3,403,139 | 9/1968 | Natta | 260—88.2 |
| 3,310,537 | 3/1967 | Natta | 260—80.78 |

JOSEPH L. SCHOFER, Primary Examiner

R. S. BENJAMIN, Assistant Examiner

U.S. Cl. X.R.

260—80.78